(12) United States Patent
Meisel et al.

(10) Patent No.: US 7,093,814 B2
(45) Date of Patent: Aug. 22, 2006

(54) VIBRATION ISOLATING MOUNT

(75) Inventors: Paul Meisel, Dublin, OH (US); Matthew Swysgood, Galena, OH (US)

(73) Assignee: Kinetics Noise Control, Inc., Dublin, OH (US)

( * ) Notice: Subject to any disclaimer, the term of this patent is extended or adjusted under 35 U.S.C. 154(b) by 71 days.

(21) Appl. No.: 10/455,481

(22) Filed: Jun. 5, 2003

(65) Prior Publication Data

US 2004/0245427 A1    Dec. 9, 2004

Related U.S. Application Data

(60) Provisional application No. 60/386,295, filed on Jun. 5, 2002.

(51) Int. Cl.
*F16M 13/00* (2006.01)

(52) U.S. Cl. .................................... 248/562; 52/480

(58) Field of Classification Search ............... 248/562, 248/618, 638; 52/480, 167.1, 167.8, 144, 52/145; 181/284, 285, 294, 293, 198, 286
See application file for complete search history.

(56) References Cited

U.S. PATENT DOCUMENTS

| | | | | |
|---|---|---|---|---|
| 1,350,349 A * | 8/1920 | Walther | ................ | 52/402 |
| 1,822,026 A * | 9/1931 | Guy | ................ | 267/141.1 |
| RE18,573 E * | 8/1932 | Kocher | ................ | 52/402 |
| 2,582,998 A * | 1/1952 | Lee | ................ | 267/140.13 |
| 2,896,937 A * | 7/1959 | Miller | ................ | 267/134 |
| 2,926,881 A * | 3/1960 | Painter | ................ | 267/141.4 |
| 3,103,255 A * | 9/1963 | Boschi et al. | ................ | 181/293 |
| 3,788,021 A * | 1/1974 | Husler | ................ | 52/403.1 |
| 4,110,948 A * | 9/1978 | Maier, Jr. | ................ | 52/402 |
| 4,199,128 A * | 4/1980 | van den Boom et al. | ................ | 267/140.13 |
| 4,420,062 A * | 12/1983 | Fukushima | ................ | 181/204 |
| 4,434,592 A * | 3/1984 | Reneault et al. | ................ | 52/145 |
| 4,657,219 A * | 4/1987 | Kakimoto | ................ | 248/562 |
| 5,121,905 A * | 6/1992 | Mann et al. | ................ | 267/141.4 |
| 5,242,146 A * | 9/1993 | Tecco et al. | ................ | 248/638 |
| 5,465,534 A * | 11/1995 | Mittag | ................ | 52/126.6 |
| 5,473,125 A * | 12/1995 | Stief et al. | ................ | 181/290 |
| 5,550,338 A * | 8/1996 | Hielscher | ................ | 181/290 |
| 5,778,621 A * | 7/1998 | Randjelovic | ................ | 52/403.1 |
| 5,842,677 A * | 12/1998 | Sweeney et al. | ................ | 248/635 |
| 6,055,785 A * | 5/2000 | Counihan | ................ | 52/403.1 |
| 6,085,479 A * | 7/2000 | Carver | ................ | 52/309.8 |
| 6,115,981 A * | 9/2000 | Counihan | ................ | 52/403.1 |
| 6,158,176 A * | 12/2000 | Perdue | ................ | 52/144 |
| 6,267,347 B1 | 7/2001 | Ryan et al. | | |
| 6,363,675 B1 * | 4/2002 | Shelton | ................ | 52/403.1 |
| 6,397,985 B1 * | 6/2002 | Wiebe | ................ | 188/129 |
| 6,634,155 B1 * | 10/2003 | Smith | ................ | 52/729.1 |

* cited by examiner

*Primary Examiner*—Korie Chan
(74) *Attorney, Agent, or Firm*—Kathleen K Bowen

(57) ABSTRACT

The present invention comprises a vibration isolating mount used to mount a furring channel to a mounting surface wherein the furring channel comprises a channel portion and two opposing furring channel flanges. The vibration isolating mount comprises a vibration isolator of a size and shape to fit snugly around the furring channel flanges, wherein the vibration isolator has opposing flanges extending away from the furring channel flanges; and mounting brackets, wherein the mounting brackets wrap around the vibration isolator flanges, and wherein the mounting brackets are isolated from the furring channel by the vibration isolator.

9 Claims, 2 Drawing Sheets

VIBRATION ISOLATING MOUNT

This application claims the benefit of U.S. Provisional Application No. 60/386,295, filed Jun. 5, 2002.

BACKGROUND

The present invention is in the field of noise and vibration control. More specifically this invention relates to an apparatus for isolating the structureborne vibration, and therefore the noise transferred from one part of a building to another.

In many building applications, furring channels are used to attach one part of a building structure, for example wallboard or other sheet material, to another part of the building structure. Noise, transmitted structurally as vibration, is often transmitted from one part of the building to another through the furring channel connection points.

Previously, furring channel mounting brackets were coated with a vibration absorbing material to reduce the noise transmitted through these mounting points. Although this does reduce the noise somewhat, these coated mounting brackets are expensive to manufacture.

Another existing method for reducing this noise is an acoustic mount, U.S. Pat. No. 6,267,347 by Ryan et al. This acoustic mount consists of a metal clip, a metal bushing, and a sound absorbing insert. The metal clip is clipped onto the furring channel; the sound absorbing insert is threaded into the metal clip; and the bushing passes through the sound absorbing insert. In this acoustic mount the connecting means is then passed through the bushing into the mounting surface, thus isolating the furring channel from the mounting surface. This configuration has metal to metal contact (metal clip against metal channel), and is not optimally dampened or isolated.

A vibration isolating mount is desired which would more effectively isolate noise and vibration from one part of a building to an adjoining part of the building. This mount should be economical to produce, and easy to install.

SUMMARY OF THE INVENTION

The present invention comprises a vibration isolating mount used to mount a furring channel to a mounting surface wherein the furring channel comprises a channel portion and two opposing furring channel flanges. The vibration isolating mount comprises a vibration isolator of a size and shape to fit snugly around the furring channel flanges, wherein the vibration isolator has opposing flanges extending away from the furring channel flanges; and mounting brackets, wherein the mounting brackets wrap around the vibration isolator flanges, and wherein the mounting brackets are isolated from the furring channel by the vibration isolator.

DETAILED DESCRIPTION

Figure 1:
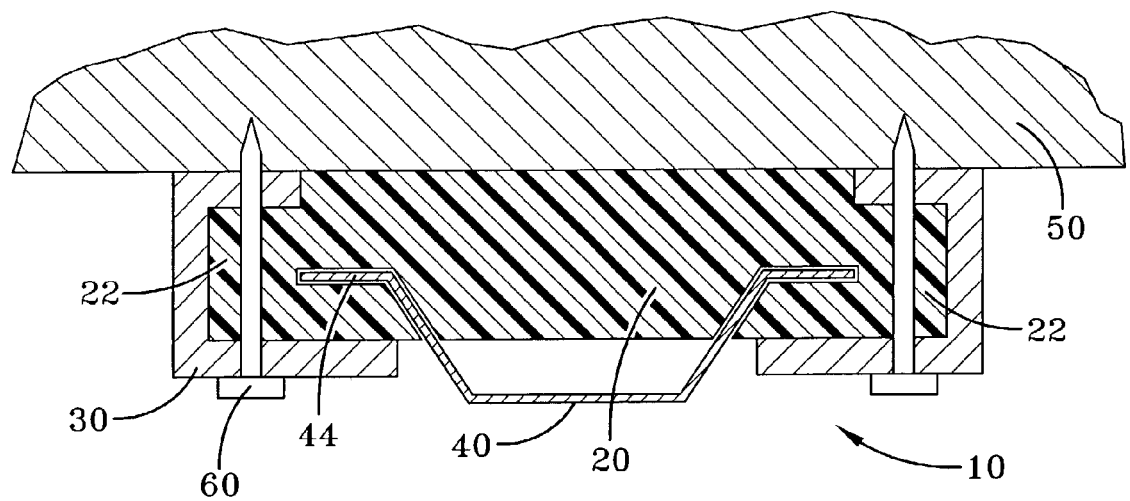
FIG. 1 is cross section of an installed vibration isolating mount according to an aspect of the invention.
Figure 2:
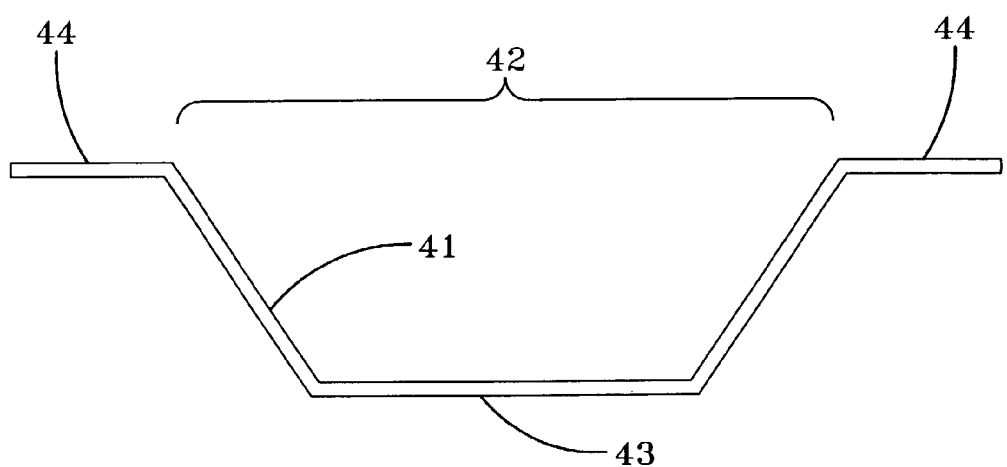
FIG. 2 is a cross section of a furring channel.
Figure 3:
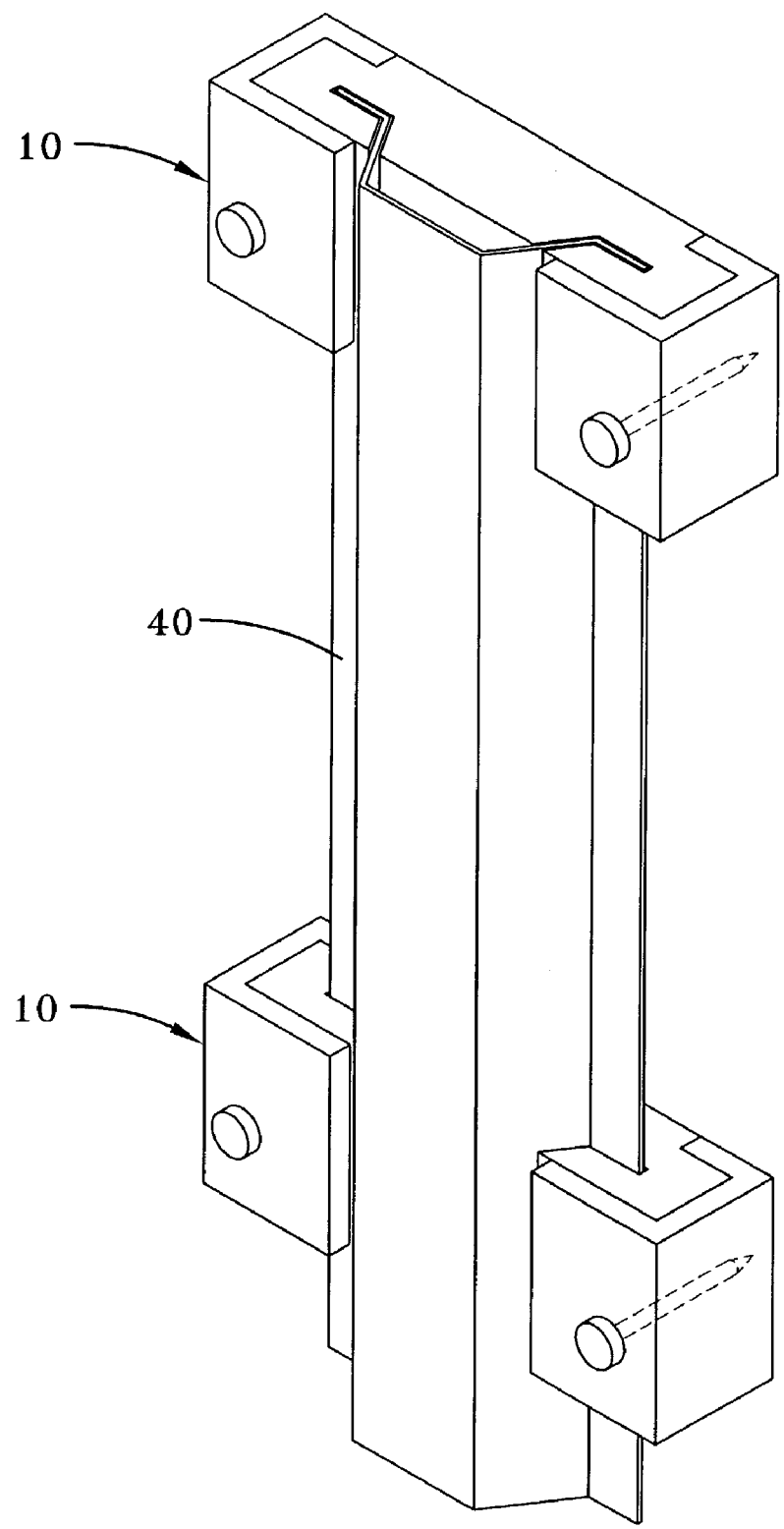
FIG. 3 is an isometric view of a vibration isolating mount according to an aspect of the invention.

Various aspects of the invention are presented in FIGS. 1–3 which are not drawn to scale and in which like components are numbered alike. Referring now to FIGS. 1–2, according to an aspect of the invention, a vibration isolating mount 10 is used to mount a furring channel 40 to a mounting surface 50. The furring channel 40 comprises a channel portion 42 and two opposing furring channel flanges 44.

According to this aspect of the invention, the vibration isolating mount 10 comprises a vibration isolator 20 of a size and shape to fit snugly around the furring channel flanges 44. Direct contact between the furring channel and the vibration isolator more effectively dampens the vibration in the furring channel than do the prior art mounts with metal to metal contact between the mounting clip and the furring channel. The vibration isolator 20 has opposing vibration isolator flanges 22 extending away from the furring channel flanges 44. The vibration isolating mount 10 further comprises mounting brackets 30, wherein the mounting brackets 30 wrap around the vibration isolator flanges 22. The mounting brackets 30 are isolated from the furring channel 40 by the vibration isolator 20. In a preferred embodiment the vibration isolator flanges 22 are just an extension of the vibration isolator 20 and are the same thickness as the rest of the vibration isolator 20.

According to a further aspect of the invention, the channel portion 42 of the furring channel 40 further comprises an inner surface 41 and an outer surface 43. A furring channel is often referred to as a 'hat channel' due to the cross-section of a furring channel resembling the cross-section of a hat. Visualizing the cross-section of a furring channel as the cross section of a hat, the inner surface 41 would be the inside surface of the hat, the outer surface 43 would be the outside of the hat, and the furring channel flanges 44 would be the brim of the hat. Therefore the inner surface 41 is the generally concave face of the furring channel 40. The vibration isolator 20 bridges the furring channel inner surface 41.

In a preferred embodiment of the invention, the vibration isolator 20 comprises an elastomeric material. In a further preferred embodiment, the vibration isolator 20 comprises a molded elastomeric material. The vibration isolator 20 may comprise a natural rubber such as a 50 durometer natural rubber, or a neoprene material, or any other suitable vibration damping material.

According to another aspect of the invention the vibration isolating mount 10 further comprises a mounting means 60 for mounting the vibration isolating mount 10 to a mounting surface 50. The mounting means 60 may comprise screws, bolts, or any other suitable mounting means.

In a further preferred embodiment of the invention, the mounting brackets 30 wrap around the vibration isolator flanges 22 such that the mounting means 60 passes through the mounting brackets 30 twice.

According to a further aspect of the invention, the mounting brackets 30 overlap the furring channel flanges 44. This configuration provides added structural integrity in the event of a fire. If, during a fire, the vibration isolator 20 material were to become soft, the mounting brackets 30 would help to prevent the mounted structure from collapsing.

What is claimed is:

1. A vibration isolating mount mounting a furring channel to a mounting surface, wherein the furring channel comprises a channel portion and two opposing furring channel flanges, comprising:
   a vibration isolator of a size and shape fitting snugly around the furring channel flanges, wherein said vibration isolator has opposing flanges extending away from the furring channel flanges, wherein a portion of the furring channel remains exposed outwardly of the mounting surface such that a wallboard may be attached to the furring channel; and, mounting brackets for mounting said vibration isolator and the furring channel to the mounting surface, wherein said mounting brackets wrap around said vibration isolator flanges, and wherein said mounting brackets are isolated from the furring channel by said vibration isolator.

2. The vibration isolating mount of claim 1 wherein said vibration isolator comprises an elastomeric material.

3. The vibration isolating mount of claim 1 wherein said vibration isolator comprises a molded elastomeric material.

4. The vibration isolating mount of claim 1 wherein said vibration isolator comprises a 50 durometer natural rubber.

5. The vibration isolating mount of claim 1 wherein said vibration isolator comprises a neoprene material.

6. The vibration isolating mount of claim 1 further comprising a mounting means for mounting said vibration isolating mount to a mounting surface.

7. A vibration isolating mount mounting a furring channel to a mounting surface, wherein the furring channel comprises a channel portion and two opposing furring channel flanges, comprising:

a vibration isolator of a size and shape fitting snugly around the furring channel flanges, wherein said vibration isolator has opposing flanges extending away from the furring channel flanges;

mounting brackets, wherein said mounting brackets wrap around said vibration isolator flanges, and wherein said mounting brackets are isolated from the furring channel by said vibration isolator; and, a mounting means for mounting said vibration isolating mount to a mounting surface, wherein said mounting brackets wrap around said vibration isolator flanges such that said mounting means passes through said mounting brackets twice.

8. The vibration isolating mount of claim 1 wherein said mounting brackets overlap the furring channel flanges.

9. A vibration isolating mount mounting a furring channel to a mounting surface, wherein the furring channel comprises a channel portion and two opposing furring channel flanges, comprising:

a vibration isolator of a size and shape fitting snugly around the furring channel flanges, wherein said vibration isolator has opposing flanges extending away from the furring channel flanges; wherein the channel portion of the furring channel further comprises an inner surface and an outer surface wherein the inner surface is a generally concave face of the furring channel, and wherein said vibration isolator bridges the furring channel inner surface wherein a portion of the furring channel remains exposed outwardly of the mounting surface such that a wallboard may be attached to the furring channel; and, mounting brackets for mounting said vibration isolator and the furring channel to the mounting surface, wherein said mounting brackets wrap around said vibration isolator flanges, and wherein said mounting brackets are isolated from the furring channel by said vibration isolator.

\* \* \* \* \*